Nov. 9, 1965    JEAN-PIERRE FAIL ETAL    3,216,525
FLUID ACTUATED VIBRATOR
Filed July 23, 1962

INVENTOR
JEAN PIERRE FAIL
GERARD GRAU
MICHEL LAVERGNE
BY
Toulmin & Toulmin ATTORNEYS

3,216,525
FLUID ACTUATED VIBRATOR
Jean-Pierre Fail and Gérard Grau, Paris, and Michel Lavergne, Le Vesinet, France, assignors to Institut Francais du Petrole, des Carburants et Lubrifiants, Rueil-Malmaison, Seine-et-Oise, France
Filed July 23, 1962, Ser. No. 211,767
Claims priority, application France, Sept. 4, 1961, 872,410
6 Claims. (Cl. 181—.5)

The present invention relates to a vibrator system, more particularly, to a fluid actuated electrically controlled vibrator particularly adapted for use in seismic prospecting.

It is already known to make use of vibrators in seismic prospecting so as to obtain such convenient signals wherein the function of correlation between the signal reflected on a single mirror and the emitted signal exhibits a sharp maximum value in the form of a pulse of very high amplitude and short duration. These signals are preferred to those generated by detonating charges which generally do not contain many of the seismic frequencies.

The signals produced by a vibrator thus provide means for considerably improving the ratio of the reflected signal to the noise level, by movable correlation of the reflected signal with the emitted signal.

However, up to the present, it was not possible to produce by means of a vibrator an elastic signal having predetermined characteristics and the intensity of which is proportional to a corresponding electrical control signal supplied to the vibrator.

It is therefore an object of this invention to provide for a vibrating system producing elastic signals having predetermined characteristics.

It is another object of this invention to provide a vibrating system with electrical control means whereby the intensity of the signals produced by the vibrator is proportional to the electric signal applied to said control means.

It is a further object of this invention to provide a vibrating system comprising control means for use in seismic prospecting imparting to the earth a force which is strictly proportional to the voltage supplied to said control means.

These and other objects as may be apparent from the following description and claims are achieved according to this invention by use of electric feed-back controlling means actuating hydraulic jacks of a fluid operated vibrating system.

This vibrating system may consist either of a single vibrator or of a plurality of vibrators operated in phase and so spaced with respect to each other as to reduce the surface waves.

Figure 1:
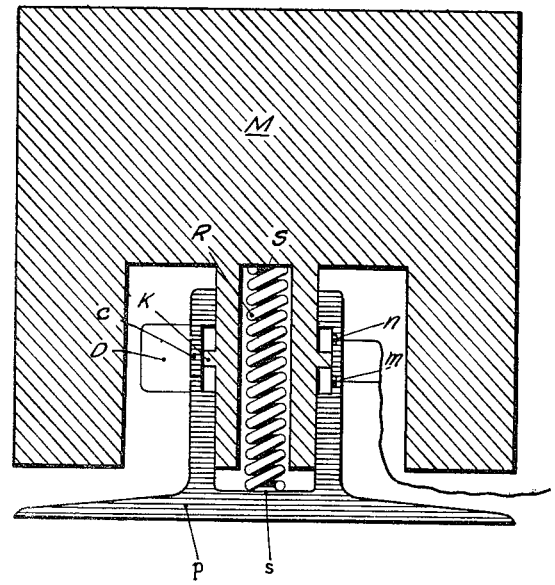
Figure 2:
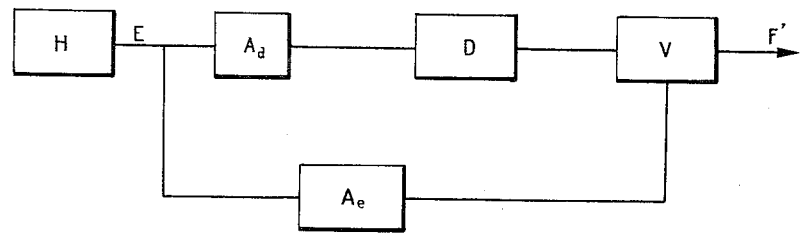

The invention will be more fully explained with reference to the accompanying drawings illustrating a preferred embodiment of the invention selected for purposes of illustration and wherein;

FIGURE 1 is a cross-sectional view of a fluid operated vibrator for seismic prospecting according to the invention, and FIGURE 2 is a schematic diagram of the feedback circuit for controlling the vibrator.

As seen in FIGURE 1, the vibrator comprises a light base or pulsing plate P in contact with the earth surface and a substantially heavier mass M supported upon said pulsing plate by both a hydraulic jack controlled by a servodistributor of fluid under pressure and resilient means comprising one or more springs R for counteracting the weight of the mass M, since the hydraulic jack is not well adapted for balancing a continuous force.

The spring R, supporting the mass M, bears against abutments S and s which are rigidly mounted on the mass M and the pulsing plate P respectively.

The hydraulic jack comprises a piston K rigidly mounted on the mass M and a cylinder C integral with the pulsing plate P. It is controlled by means of a servodistributor D of conventional type, so that the pressure difference acting on the piston is proportional to the electric control signal.

The two forces of equal magnitudes and opposite directions applied by the hydraulic jack to the mass M and to the pulsing plate P are thus substantially proportional to the electric control signal.

The maximum stroke of the piston in the cylinder is so selected that a sufficient inertia force is produced by the mass M even at the lower frequencies used.

The force produced by the jack must not exceed the weight of the mass M so as to prevent the vibrator from jumping up off of the earth surface. As a matter of fact, in the absence of a signal, the weight of mass M is applied to the pulsing plate through spring R. When an electric signal is supplied to the jack, the force produced by the latter tends either to move the plate P and mass M away from each other or to bring them closer together. When the force produced by the jack tends to bring the plate P and the mass M closer to each other, the plate P tends to jump up off of the earth surface due to the high inertia of the mass M.

In order to maintain the pulsing plate P in contact with the earth surface, the upward force applied thereto by the hydraulic jack must be less than the continuous force exerted thereon downwardly which is substantially equal to the weight of mass M.

To the contrary, when the force produced by the hydraulic jack tends to move the plate P away from the mass M, such a force is added to the continuous downward force exerted on the plate by mass M.

If F represents the weight of mass M and F' the force exerted by the hydraulic jack on the pulsing plate P, the total force applied to the earth surface will vary between $F-F'$ and $F+F'$, F' being in all cases lower than F.

The signal frequency which may thus be transmitted to the earth, falls within the range between a lower limit $f_1$ equal to the resonance frequency of the assembly formed by mass M and spring R and an upper limit $f_2$ equal to the resonance frequency of the system formed by the pulsing plate and the earth.

When the vibrator is used for seismic prospecting, the range of the useful frequencies is generally of from 5 to 150 cycles per second. This band of frequencies may be easily completely covered by a signal provided that the rigidity of the spring R is conveniently selected and of such a value that the resonance frequency of the assembly formed by the spring and the mass is less than, for example, 2 cycles per second. The resonance frequency of the pulsing plate-earth system will be given a value higher than the limit frequency of 150 cycles per second by selecting a pulsing plate P of a sufficiently low mass and a relatively large surface.

Whatever the useful band width, it is thus always possible to adapt the characteristics of the apparatus (rigidity of the spring, mass and surface of the pulsing plate) so as to transmit to the earth a force substantially proportional to the electric control signal within said band of frequencies.

Such a proportionality is an essential feature, particularly in the case where a plurality of vibrators are to be operated in phase.

It is achieved by use of a feedback system of the type illustrated in FIGURE 2.

A voltage generator H produces a voltage E which varies in accordance with the signal to be transmitted to the earth. After amplification by amplifier $A_d$, this voltage actuates the distributor D which controls the hydraulic jack V producing the force F' which has to be transmitted to the earth.

The feedback regulating system secures this proportionality of the force transmitted to the earth with the control signal within the useful range of frequencies.

This feedback is carried out by means of an electric signal measuring the pressure difference between the two chambers separated by the piston K, which pressure difference is proportional to the force F'. This electric signal is provided by conventional pressure transducers ($m$ and $n$ in FIGURE 1) for instance of the piezoelectric type, located in the body of the hydraulic jack, amplified by amplifier $A_e$ and supplied at the input of the amplifier $A_d$ wherein it is added to the signal E produced by the generator H.

Designating G as the gain of the amplifier $A_d$ and $\beta$ the gain of the amplifier $A_e$, the well known following relation between the force F' and the voltage E is observed when $\beta G$ is much higher than 1 (i.e. when 1 is negligible as compared to the value of $\beta G$):

$$kF' = -1/\beta E$$

which relation expresses the proportionality between F' and E inasmuch as the value of $\beta$ is constant and no phase displacement is introduced by amplifier $A_e$ within the range of useful frequencies.

The force F' being identical to the force transmitted to the earth within the range of frequencies between $f_1$ and $f_2$, the elastic signal transmitted to the earth is in exact conformity with the controlling electric signal within said range of frequencies.

It will be understood that this invention is susceptible to modifications in order to adapt it to different usages and conditions and, accordingly, it is desired to comprehend such modifications within this invention as may fall within the scope of the appended claims.

What is claimed is:

1. An electrically controlled fluid actuated vibrator comprising a pulsing plate positionable upon a surface, a hydraulic jack comprising two chambers separated by piston means, and resilient means mounted upon said pulsing plate, a mass substantially heavier than said pulsing plate and supported upon said hydraulic jack and said resilient means, a servodistributor for fluid under pressure operatively connected to said chambers and actuated by an electric control signal, a feedback circuit including pressure-sensitive transducer means in each of said chambers for producing an electric signal proportional to the pressure difference exerted on said hydraulic jack, and means for feeding back said latter signal to the electric control signal actuating said hydraulic jack.

2. The vibrator of claim 1, wherein said pressure-sensitive transducer means comprises piezoelectric means.

3. An electrically controlled fluid actuated vibrator comprising a pulsing plate positionable upon a surface, a hydraulic jack comprising two chambers separated by piston means, and resilient means mounted upon said pulsing plate, a mass substantially heavier than said pulsing plate and supported upon said hydraulic jack and said resilient means, said resilient means and mass forming an assembly having a low resonance frequency, a servodistributor for fluid under pressure operatively connected to said chambers and actuated by an electric control signal, a feedback circuit including pressure-sensitive transducer means in each of said chambers for producing an electric signal proportional to the pressure difference exerted on said hydraulic jack, and means for feeding back said latter signal to the electric control signal actuating said hydraulic jack.

4. The vibrator of claim 3, wherein said pressure-sensitive transducer means comprises piezoelectric means.

5. An electrically controlled fluid actuated vibrator for seismic prospecting, comprising a pulsing plate positionable upon the surface of the earth wherein the assembly of the pulsing plate and the earth has a relatively high resonance frequency, a hydraulic jack comprising two chambers separated by piston means, resilient means mounted upon said pulsing plate, a mass substantially heavier than said pulsing plate and supported upon said hydraulic jack and said resilient means, a servodistributor for fluid under pressure operatively connected to said chambers and actuated by an electric control signal, a feedback circuit including pressure-sensitive transducer means in each of said chambers producing an electric signal proportional to the pressure difference exerted on said hydraulic jack, and means for feeding back said latter signal to the electric control signal actuating said hydraulic jack.

6. The vibrator of claim 5, wherein said pressure-sensitive means comprises piezoelectric means.

References Cited by the Examiner

UNITED STATES PATENTS

| | | | |
|---|---|---|---|
| 1,753,368 | 4/30 | DuBois-Reymond et al. | 340—12 |
| 2,745,507 | 5/56 | Bodine | 181—.53 |
| 2,792,804 | 5/57 | Bouyoucos et al. | |
| 2,910,134 | 10/59 | Crawford et al. | 181—.53 |
| 3,009,447 | 11/61 | Lloyd | 91—370 X |
| 3,024,861 | 3/62 | Clynch | 181—.53 |
| 3,106,982 | 10/63 | Wade | 181—.53 |

SAMUEL FEINBERG, *Primary Examiner.*

CHESTER L. JUSTUS, *Examiner.*